US012188723B2

(12) United States Patent
Goto et al.

(10) Patent No.: US 12,188,723 B2
(45) Date of Patent: Jan. 7, 2025

(54) ROTARY KILN

(71) Applicant: Noritake Co., Limited, Nagoya (JP)

(72) Inventors: Hidenao Goto, Kariya (JP); Sayaka Kato, Kariya (JP); Yoshiaki Ozawa, Kariya (JP); Minoru Hasegawa, Kariya (JP)

(73) Assignee: Noritake Co., Limited, Nagoya (JP)

(*) Notice: Subject to any disclaimer, the term of this patent is extended or adjusted under 35 U.S.C. 154(b) by 57 days.

(21) Appl. No.: 18/147,115

(22) Filed: Dec. 28, 2022

(65) Prior Publication Data

US 2023/0204286 A1 Jun. 29, 2023

(30) Foreign Application Priority Data

Dec. 28, 2021 (JP) ................................ 2021-215082

(51) Int. Cl.
*F27B 7/10* (2006.01)
*F27B 7/36* (2006.01)
(Continued)

(52) U.S. Cl.
CPC .................. *F27B 7/10* (2013.01); *F27B 7/36* (2013.01); *F27B 7/362* (2013.01); *F27B 9/10* (2013.01);
(Continued)

(58) Field of Classification Search
CPC ...... F27B 7/10; F27B 7/20; F27B 7/22; F27B 7/3205; F27B 7/34; F27B 7/36;
(Continued)

(56) References Cited

U.S. PATENT DOCUMENTS

| | | | | |
|---|---|---|---|---|
| 3,698,697 A * | 10/1972 | Gillies | ...................... | F27B 7/32 432/117 |
| 4,612,711 A | 9/1986 | Murray | | |

(Continued)

FOREIGN PATENT DOCUMENTS

| | | |
|---|---|---|
| CN | 201297836 Y | 8/2009 |
| CN | 210321126 U | 4/2020 |

(Continued)

OTHER PUBLICATIONS

Translation for JP 2016109304 A (Year: 2016).*
First Office Action issued by JPO, Appln. JP 2021-215082, 4 pgs Mar. 17, 2022.

*Primary Examiner* — Steven B McAllister
*Assistant Examiner* — Benjamin W Johnson
(74) *Attorney, Agent, or Firm* — Gerald W. Roberts; John V. Daniluck; Dentons Bingham Greenebaum LLP

(57) ABSTRACT

A rotary kiln includes: a heating tube; a material feeding unit disposed on a first end of the heating tube; a material collection unit disposed on a second end of the heating tube; an inner cylinder supported at the second end of the heating tube with the inner cylinder being inserted in a central portion of the heating tube; a plurality of branch tubes disposed circumferentially on an outer circumferential surface of the inner cylinder, each of the branch tubes branching from the inner cylinder and extending in an axial direction along an inner circumferential surface of the heating tube; a hot air supply tube supported to be relatively rotatable with respect to the inner cylinder with the hot air supply tube being inserted in one end of the inner cylinder that extends outside the heating tube; and a drive mechanism that rotates the heating tube.

12 Claims, 7 Drawing Sheets

(51) Int. Cl.

| | |
|---|---|
| ***F27B 9/10*** | (2006.01) |
| *F27B 7/20* | (2006.01) |
| *F27B 7/22* | (2006.01) |
| *F27B 7/32* | (2006.01) |
| *F27B 7/34* | (2006.01) |
| *F27B 7/42* | (2006.01) |
| *F27B 9/30* | (2006.01) |
| *F27B 9/36* | (2006.01) |
| *F27B 9/39* | (2006.01) |

(52) U.S. Cl.

CPC . *F27B 7/20* (2013.01); *F27B 7/22* (2013.01); *F27B 7/3205* (2013.01); *F27B 2007/327* (2013.01); *F27B 7/34* (2013.01); *F27B 7/42* (2013.01); *F27B 9/30* (2013.01); *F27B 9/36* (2013.01); *F27B 9/39* (2013.01)

(58) Field of Classification Search

CPC .... F27B 7/362; F27B 7/42; F27B 9/10; F27B 9/30; F27B 9/36; F27B 9/39; F27B 2007/327

USPC .......................................................... 432/117

See application file for complete search history.

(56) References Cited

U.S. PATENT DOCUMENTS

| | | | | |
|---|---|---|---|---|
| 6,860,735 | B1 | 3/2005 | Shimono | |
| 2004/0012129 | A1 * | 1/2004 | Summer | C22B 7/003 266/87 |
| 2010/0224028 | A1 * | 9/2010 | Tsutsumi | F27D 9/00 75/484 |
| 2011/0065058 | A1 * | 3/2011 | Kumagai | F27B 7/38 432/112 |

FOREIGN PATENT DOCUMENTS

| | | | | | |
|---|---|---|---|---|---|
| DE | 19835734 | A1 | | 2/2000 | |
| JP | 2000246210 | A | | 9/2000 | |
| JP | 2000274949 | A | | 10/2000 | |
| JP | 2002130629 | A | | 5/2002 | |
| JP | 2005121322 | A | | 5/2005 | |
| JP | 2006057974 | A | | 3/2006 | |
| JP | 2016109304 | A | * | 6/2016 | F26B 17/32 |
| WO | 2002025195 | A1 | | 3/2002 | |

* cited by examiner

ROTARY KILN

CROSS-REFERENCE TO RELATED APPLICATIONS

The present application claims priority from Japanese Patent Application No. 2021-215082 filed on Dec. 28, 2021, which is incorporated by reference herein in its entirety.

BACKGROUND OF THE INVENTION

The present disclosure relates to a rotary kiln.

JP 2000-246210 A discloses a pyrolysis drum equipped with a horizontal-type rotary drum is provided for receiving a waste material from a screw conveyor into its interior space and a plurality of heat transfer tubes for circulating a heating gas serving as a heating medium for heating the waste material. The heat transfer tubes are provided in the interior space of the rotary drum in such a state that they are along a longitudinal direction of the rotary drum. The pyrolysis drum is further equipped with a heating gas supply part for the heat transfer tubes, a heating gas exhaust part, and a pyrolysis gas and pyrolysis residue discharge part.

JP 2006-057974 A discloses a waste material pyrolysis equipment equipped with a pyrolysis drum and a pyrolysis gas combustion furnace. The pyrolysis drum includes a drum body in which a heating tube is disposed, a heating gas inlet housing disposed at one end of the drum body, and a heating gas outlet housing disposed at the other end of the drum body. The heating gas combustion furnace supplies, as the heating gas, a combustion exhaust gas generated by combusting part of the pyrolysis gas to the heating gas inlet housing.

SUMMARY OF THE INVENTION

The present inventors believe that, in consideration of post-processes, it may be desirable to lower the temperature of material having undergone a heat treatment when discharging the material.

A rotary kiln according to the present disclosure includes a heating tube, a material feeding unit, a material collection unit, an inner cylinder, branch tubes, and a drive mechanism. The heating tube is a substantially hollow cylindrical tube. The material feeding unit is disposed on a first end of the heating tube. The material collection unit is disposed on a second end of the heating tube. The inner cylinder is supported at the second end of the heating tube with the inner cylinder being inserted in a central portion of the heating tube. The branch tubes include a plurality of tubes arranged circumferentially on the outer circumferential surface of the inner cylinder inside the heating tube, each of which branches from the inner cylinder and extends in an axial direction along the inner circumferential surface of the heating tube. The hot air supply tube is supported to be relatively rotatable with respect to the inner cylinder with the hot air supply tube being inserted in one end of the inner cylinder that extends out of the heating tube. The drive mechanism is a mechanism that rotates the heating tube. The rotary kiln as described above includes branch tubes that branch from the inner cylinder supported at the second end of the heating tube and are inserted in the central portion of the heating tube and extend in an axial direction along the inner circumferential surface of the heating tube. Accordingly, the rotary kiln is able to lower the temperature of the material having undergone a heat treatment when discharging the material at the second end of the heating tube.

For example, the branch tubes may extend outside the heating tube from the first end of the heating tube, and the rotary kiln may further include an exhaust duct being disposed outside the first end of the heating tube and covering an outlet of each of the branch tubes. In another embodiment, the branch tubes may extend outside the heating tube at an intermediate portion of the heating tube, and the rotary kiln may further include an exhaust duct covering an outlet of each of the branch tubes that extends outside the heating tube.

The rotary kiln may further include a manifold disposed at a central portion of the heating tube and connected to the branch tubes, and at least one exhaust tube extending outside the heating tube from the manifold. The exhaust duct may be an annular duct that is circumferentially continuous on the intermediate portion. Each of the branch tubes may be a hollow cylindrical tube. The inner cylinder may be a hollow cylindrical tube.

The rotary kiln may further include a tunnel-shaped furnace body and a heater disposed in the furnace body. In this case, the heating tube may penetrates the furnace body and may be configured to be rotatable with respect to the furnace body. The branch tubes may branch at a location where the heating tube enters the furnace body.

The heating tube may be configured to deliver powdery material from a part of the heating tube adjacent to the first end toward the second end in association with its circumferential rotation. For example, the first end of the heating tube may be arranged to be higher than the second end. In this case, the heating tube may include a slope extending between the first end and the second end and having an angle of slope of 0.5 degrees to 1 degree. It is also possible to provide a spiral blade on the inner circumferential surface of the heating tube.

DETAILED DESCRIPTION OF THE INVENTION

Figure 1:
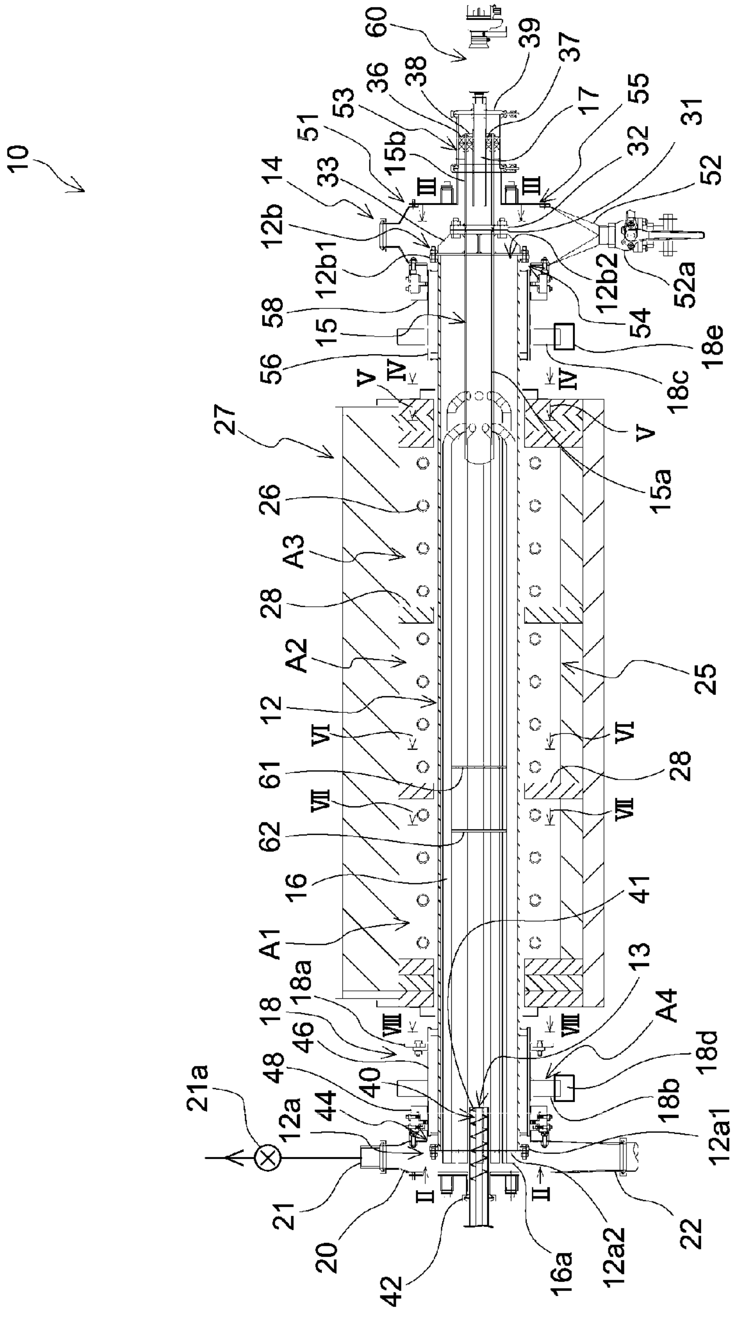
FIG. 1 is a longitudinal cross-sectional view of a rotary kiln 10.

Hereinbelow, typical embodiments of the present disclosure will be described with reference to the drawings. Throughout the drawings, identical reference characters and descriptions are used to designate like elements or features. It should be noted that dimensional relationships (length, width, thickness, and the like) in the drawings do not necessarily reflect actual dimensional relationships.

Rotary Kiln 10

FIG. 1 is a longitudinal cross-sectional view of a rotary kiln 10. The rotary kiln 10 includes, as illustrated in FIG. 1, a heating tube 12, a material feeding unit 13, a material collection unit 14, an inner cylinder 15, branch tubes 16, a hot air supply tube 17, a drive mechanism 18, and an exhaust duct 20.

Heating Tube 12

In the embodiment shown in FIG. 1, the heating tube 12 of the rotary kiln 10 is a substantially hollow cylindrical pipe, the axis of which is depicted to extend horizontally, but in reality, it extends at a predetermined angle of slope. The heating tube 12 is arranged so that its first end 12*a* is higher than its second end 12*b*. The heating tube 12 may have a length that is required as a heating furnace that heats material. Although the heating tube 12 herein is a hollow cylindrical shaped tube, it is also possible that the heating tube 12 may be provided with a flange or the like, and it does not need to be perfectly in a cylindrical shape in its insignificant parts.

Herein, examples of the material to be fed into the rotary kiln 10 include ceramic powder, such as barium titanate powder, and metal powder, such as ferrite powder, and the rotary kiln 10 is used for calcinating such powdery materials. From such a viewpoint, the heating tube 12 is required to have corrosion resistance according to the material to be heated or the atmosphere gas used in heating. In this embodiment, it is possible to use a stainless steel (for example, SUS316) for the heating tube 12. Depending on the applications, the heating tube 12 may be made of a ceramic.

The heating tube 12 may be referred to as a "furnace core tube" as appropriate. In this embodiment, flanges 12*a*1 and 12*b*1 are provided on an end portion of the heating tube 12 near the first end 12*a* and an end portion of the heating tube 12 near the second end 12*b*, respectively. In this embodiment, because the heating tube 12 is arranged so that the first end 12*a* is higher than the second end 12*b*, the material is conveyed downward at a predetermined velocity according to rotation of the heating tube 12. From such a viewpoint, the heating tube 12 may be installed at, for example, an angle of slope of about 0.5 degrees to about 1 degree. When the angle of slope is about 0.5 degrees to about 1 degree, powdery material does not easily slide down, so the powdery material is easily conveyed at an approximate velocity according to rotation of the heating tube 12. Accordingly, it is possible to adjust, for example, the time during which the material remains inside the heating tube 12 by adjusting the rotational speed of the heating tube 12. It should be noted that the angle of slope is not limited to the above-mentioned angles but may be selected to be an appropriate angle, for example, from about 0.3 degrees to about 2 degrees.

In the embodiment shown in FIG. 1, the heating tube 1 is provided with a slope such that the first end 12*a* is arranged to be higher than the second end 12*b*. The heating tube 12 is not limited to such an embodiment that it is provided with a slope as described above, unless specifically stated otherwise. For example, it is also possible to provide a spiral blade on an inner circumferential surface of the heating tube 12 so that powdery material can be delivered from a part of the heating tube 12 adjacent to the first end 12*a* toward the second end 12*b* in association with rotation of the heating tube 12. In this case, because the powdery material is delivered from the part of the heating tube 12 adjacent to the first end 12*a* toward the second end 12*b* in association with rotation of the heating tube 12, the heating tube 12 does not need to be provided with a slope. Thus, it is sufficient that the heating tube 12 is configured to deliver powdery material from a part of the heating tube 12 adjacent to the first end 12*a* toward the second end 12*b* in association with its rotation in a circumferential direction.

Heating Chamber 25

In the embodiment shown in FIG. 1, the rotary kiln 10 further includes a tunnel-shaped furnace body 27 and a heater 26. The furnace body 27 includes a heating chamber 25 inside. In this embodiment, the heating chamber 25 may be surrounded by a furnace wall formed by, for example, stacking up ceramic fiber boards formed into a predetermined shape. The ceramic fiber board may be, for example, a plate material in which so-called bulk fibers are formed into a plate shape with an inorganic filler and an inorganic/organic binder being added thereto. The thickness of the furnace wall is set to be an appropriate thickness such that the heat from the heating chamber 25 is insulated sufficiently. The heater 26 is a device for heating the material to be processed in the heating chamber 25. As illustrated in FIG. 1, the heating tube 12 is inserted through the heating chamber 25 and is supported rotatably thereon. In this embodiment, the heating chamber 25 is provided with partitions 28 for dividing the heating chamber 25 into a plurality of spaces along a direction in which the heating tube 12 is inserted. Each of the partitions 28 may be composed of a ceramic fiber board, as with the furnace wall that forms the heating chamber 25. When the heating chamber 25 is divided into a plurality of spaces in this way, the heating chamber 25 may be heated to a predetermined temperature from outside. The temperatures of the heating tube 12 may be adjusted portion by portion.

Figure 2:
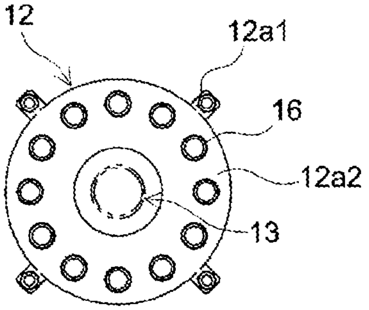
FIG. 2 is a cross-sectional view taken along line II-II in FIG. 1.

FIG. 2 is a cross-sectional view taken along line II-II in FIG. 1. FIG. 2 shows an end portion of the heating tube 12 at the first end 12*a* side. As illustrated in FIG. 2, the flanges 12*a*1 are provided intermittently on the end portion of the heating tube 12 on the first end 12*a* side. In this embodiment, four flanges 12*a*1 are disposed evenly along the circumferential direction. A support plate 12*a*2, which supports the material feeding unit 13 and end portions of the branch tubes 16, is fitted to the flanges 12*a*1. In this embodiment, the support plate 12*a*2 is fitted to the end portion of the heating tube 12 on the first end 12*a* side to close the opening of the heating tube 12 on the first end 12*a* side. At the first end 12*a* side of the heating tube 12, end portions 16*a* of the branch tubes 16 penetrate the support plate 12*a*2 so as to be exposed outward from the first end 12*a* of the heating tube 12. At the first end 12*a* side of the heating tube 12, the exhaust duct 20 is provided so as to cover the end portions 16*a* of the branch tubes 16.

Material Feeding Unit 13

The material feeding unit 13 is disposed on the first end 12*a* of the heating tube 12 to supply the material to be processed into the heating tube 12. In this embodiment, the material feeding unit 13 is composed of a screw feeder 40. An outlet 41 of the screw feeder 40, serving as the material feeding unit 13, penetrates the support plate 12*a*2 and is inserted into the heating tube 12. Although not shown in the drawings, this embodiment may be configured so that the material is supplied from a feed hopper into the heating tube 12 at a predetermined velocity by the screw feeder 40. It is also possible that an atmosphere gas used when heating the material may be supplied into the heating tube 12 through the screw feeder 40. It is also possible that the heating tube 12 may be additionally provided with a gas supply tube for supplying the atmosphere gas for heating.

Exhaust Duct 20

The exhaust duct 20 covers the first end 12*a* of the heating tube 12. The screw feeder 40, which constitutes the material feeding unit 13, penetrates the exhaust duct 20 and the support plate 12*a*2 and reaches the inside of the heating tube 12. Herein, the portion of the screw feeder 40 that penetrates the exhaust duct 20 is fitted with a sealing member 42. The exhaust duct 20 is a member that covers the first end 12*a* of the heating tube 12.

An exhaust port 21 is provided at the top of the exhaust duct 20. A drain 22 may be provided at the bottom of the exhaust duct 20. A heat insulating tube 46 is attached onto the outer circumferential surface of the end portion of the heating tube 12 on the first end 12*a* side. The exhaust duct 20 is formed with an opening 44. The end portion of the heating tube 12 on the first end 12*a* side is inserted into the opening 44. In this embodiment, the heat insulating tube 46 is fitted to the end portion of the heating tube 12 on the first end 12*a* side, and a seal member 48 is attached onto the heat insulating tube 46. The seal member 48 is a member that prevents the atmosphere inside the exhaust duct 20 from leaking outside. The seal member 48 closes the gap between the opening 44 of the exhaust duct 20 and the heat insulating tube 46 fitted to the heating tube 12.

Figure 3:
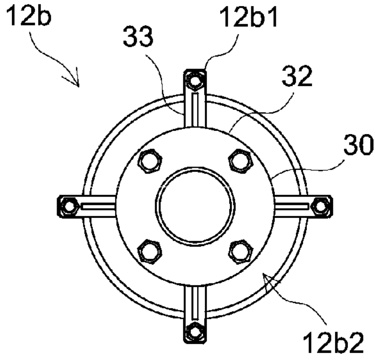
FIG. 3 is a cross-sectional view taken along line III-III in FIG. 1.

FIG. 3 is a cross-sectional view taken along line III-III in FIG. 1. FIG. 3 shows an end portion of the heating tube 12 at the second end 12*b*. As illustrated in FIG. 3, the flanges 12*b*1 are provided intermittently on the end portion of the heating tube 12 on the second end 12*b* side. In this embodiment, four flanges 12*b*1 are disposed evenly along the circumferential direction. The inner cylinder 15 is supported on the flanges 12*b*1.

Inner Cylinder 15

The inner cylinder 15 is a pipe that is supported at the second end 12*b* of the heating tube 12 with it being inserted in a central portion of the heating tube 12, to rotate with the heating tube 12. In this embodiment, the inner cylinder 15 includes a first inner cylinder 15*a* and a second inner cylinder 15*b*. The outer diameter of the first inner cylinder 15*a* is smaller than the inner diameter of the second inner cylinder 15*b*. An end portion of the first inner cylinder 15*a* is provided with a flange 31, which is connected to a flange 32 of the second inner cylinder 15*b* by a coupling. The second inner cylinder 15*b* has the same inner diameter as that of the first inner cylinder 15*a*. The second inner cylinder 15*b* is a pipe into which the hot air supply tube 17 is inserted. The first inner cylinder 15*a* is provided with a rib 33 such as to extend radially outwardly. The flange 12*b*1 of the heating tube 12 on the second end 12*b* side is attached to the just-described rib 33. Thus, the first inner cylinder 15*a* is supported via the rib 33 so as to extend along the central axis of the heating tube 12. As illustrated in FIGS. 1 and 3, the outer gap of the first inner cylinder 15*a* opens at the end portion of the heating tube 12 on the second end 12*b* side, forming a discharge port 12*b*2 from which the material is discharged. In this embodiment, the inner cylinder 15 is in a hollow cylindrical shape. Therefore, approximately a constant gap is formed between the outer circumferential surface of the inner cylinder 15 and the inner circumferential surface of the heating tube 12 along radial directions of the heating tube 12.

Material Collection Unit 14

The material collection unit 14 is disposed on such a second end 12*b* of the heating tube 12 as described above. The material collection unit 14 is a portion in which the material discharged from the discharge port 12*b*2 of the heating tube 12 is collected. In this embodiment, the material collection unit 14 is disposed outside the end portion of the heating tube 12 on the second end 12*b* side. The material collection unit 14 includes a casing 51, a hopper 52, and an inner cylinder cover 53.

Casing 51

The casing 51 is a member having a substantially prismatic container shape that covers the outside of the second end 12*b* of the heating tube 12. An opening 54 is formed in one side surface of the casing 51. The end portion of the heating tube 12 on the second end 12*b* side is inserted into the opening 54. In this embodiment, a heat insulating tube 56 is fitted to the end portion of the heating tube 12 on the second end 12*b* side, and a seal member 58 is attached onto the heat insulating tube 56. The seal member 58 is a member that prevents the atmosphere inside the casing 51 from leaking outside. The seal member 48 closes the gap between the opening 54 of the casing 51 and the heat insulating tube 56 fitted to the heating tube 12.

An opening 55 is formed in a side surface of the casing 51 that is opposite the opening 54. The inner cylinder cover 53 is attached to the opening 55. The inner cylinder cover 53 is a member that covers the circumference of the second inner cylinder 15*b*, which is connected to the first inner cylinder 15*a* protruding from the end portion of the heating tube 12 on the second end 12*b* side. The second inner cylinder 15*b* is supported rotatably on an inner surface of the inner cylinder cover 53 via a sealed bearing 36. The hot air supply tube 17 of a hot air generating device 60 is attached to the inner cylinder cover 53. The hot air supply tube 17 is supported to be relatively rotatable with respect to the inner cylinder 15 with the hot air supply tube 17 being inserted in one end of the inner cylinder 15 that extends out of the heating tube 12. In this embodiment, the hot air supply tube 17 is inserted into one end of the second inner cylinder 15*b*, which forms a portion of the inner cylinder 15.

Hot Air Generating Device 60

Herein, the hot air generating device 60 may be, for example, a gas burner or an oil burner. The hot air generating device 60 may be a boiler provided externally. The hot air supply tube 17 is a member that supplies the hot air of the hot air supply tube 17 to the second inner cylinder 15*b*. The hot air supplied to the second inner cylinder 15*b* is supplied to the first inner cylinder 15*a*. Here, a sealed bearing 37 is attached between the inner circumferential surface of the second inner cylinder 15*b* and the outer circumferential surface of the hot air supply tube 17. The second inner cylinder 15*b* is supported rotatably to the hot air supply tube 17 by the sealed bearing 37. This means that the hot air supply tube 17 does not rotate while the inner cylinder 15 rotates. In addition, a seal 38 is fitted around the hot air supply tube 17 at an end portion of the second inner cylinder 15*b*. The seal 38 serves to prevent the hot air atmosphere supplied to the interior of the second inner cylinder 15*b* from leaking into the casing 51. In addition, a seal 39 is fitted around the hot air supply tube 17 also at an end portion of the inner cylinder cover 53. The seal 39 serves to prevent the atmosphere inside the casing 51 from leaking outside through the inner cylinder cover 53.

Hopper 52

The hopper 52 is provided at the bottom of the casing 51. In this embodiment, the hopper 52 has a bottom surface both sides of which are inclined so that the gap therebetween is narrower toward the bottom of the casing 51. The heat-treated material that has been discharged from the end portion of the heating tube 12 on the second end 12*b* side into the casing 51 is gathered and collected through the hopper 52 provided at the bottom of the casing 51. An openable/closable valve 52*a* is attached to the bottom of the hopper 52. In addition, although not shown in the drawings, a collection container is provided. In the hopper 52, the valve 52*a* is opened and closed as appropriate to transfer the treated material that has been gathered through the hopper 52 to the collection container.

Branch Tubes 16

Branch tubes 16 include a plurality of tubes that are arranged circumferentially on the outer circumferential surface of the inner cylinder 15 inside the heating tube 12, each of which branches from the inner cylinder 15 and extends in an axial direction along the inner circumferential surface of the heating tube 12.

Figure 4:
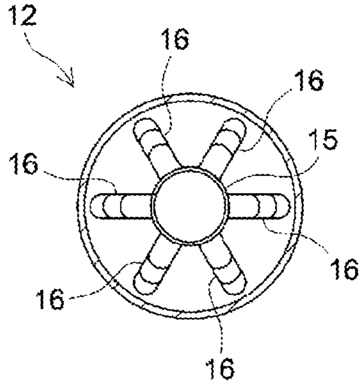
FIG. 4 is a cross-sectional view of a heating tube 12 shown in FIG. 1, taken along line IV-IV.
Figure 5:
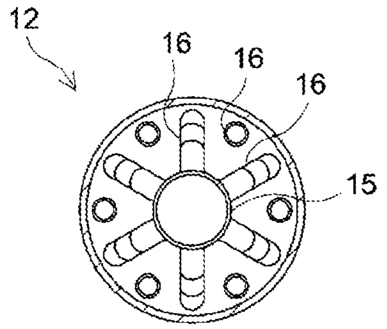
FIG. 5 is a cross-sectional view of the heating tube 12 shown in FIG. 1, taken along line V-V.

Here, FIG. 4 is a cross-sectional view of the heating tube 12 shown in FIG. 1, taken along line IV-IV. FIG. 5 is a cross-sectional view of the heating tube 12 shown in FIG. 1, taken along line V-V. FIGS. 4 and 5 each show base end portions of the branch tubes 16 each branching from the inner cylinder 15. In this embodiment, the inner cylinder 15 extends from the end portion of the heating tube 12 on the second end 12*b* into the heating tube 12 by a predetermined length. In the heating tube 12, 12 branch tubes 16 branch from the inner cylinder 15. The 12 branch tubes 16 are arranged circumferentially evenly on the outer circumferential surface of the inner cylinder 15, and each of the branch tubes 16 extends in an axial direction along the inner circumferential surface of the heating tube 12.

In this embodiment, as illustrated in FIG. 4, six branch tubes 16 branch from the inner cylinder 15 at a location where they are inserted into the heating tube 12 by a predetermined length inward from the end portion of the heating tube 12 on the second end 12*b* side. The six branch tubes 16 are disposed circumferentially evenly around the inner cylinder 15, and as illustrated in FIG. 1, each of the six branch tubes 16 extends in an axial direction toward the first end 12*a* along the inner circumferential surface of the heating tube 12. As illustrated in FIG. 5, the other six branch tubes 16 branch from the inner cylinder 15 at a location where they are inserted into the heating tube 12 further by a predetermined length inward from the end portion of the heating tube 12 on the second end 12*b* side. These six branch tubes 16 are disposed between the earlier branched six branch tubes 16, and each of these six branch tubes 16 extends in an axial direction toward the first end 12*a* along the inner circumferential surface of the heating tube 12. Thus, in this embodiment, 12 branch tubes 16 are disposed circumferentially evenly around the inner cylinder 15, and each of the branch tubes 16 extends in an axial direction toward the first end 12*a* along the inner circumferential surface of the heating tube 12.

In this embodiment, the plurality of branch tubes 16, branching from the inner cylinder 15, branch at different longitudinal locations of the inner cylinder 15. This distributes the locations at which the branch tubes 16 branch from the inner cylinder 15, serving to maintain the strength of the inner cylinder 15 and making it easier to manufacture the inner cylinder 15 and the branch tubes 16. Furthermore, in this embodiment, each of the branch tubes 16 is in a hollow cylindrical shape, so the cross section is in a circular shape.

Figure 6:
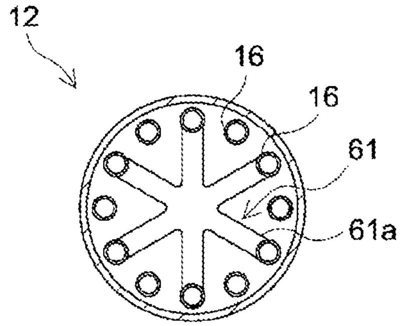
FIG. 6 is a cross-sectional view of the heating tube 12 shown in FIG. 1, taken along line VI-VI.
Figure 7:
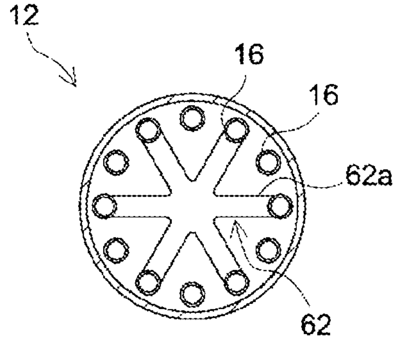
FIG. 7 is a cross-sectional view of the heating tube 12 shown in FIG. 1, taken along line VII-VII.

FIG. 6 is a cross-sectional view of the heating tube 12 shown in FIG. 1, taken along line VI-VI. FIG. 7 is a cross-sectional view of the heating tube 12 shown in FIG. 1, taken along line VII-VII. FIGS. 6 and 7 respectively show supports 61 and 62 that support intermediate portions of the branch tubes 16 branching from the inner cylinder 15. The support 61 is disposed at intermediate locations of the branch tubes 16 that are closer to the second end. In this embodiment, the support 61 supports six branch tubes 16 of the 12 branch tubes 16 that are disposed circumferentially evenly. The support 61 includes arms 61*a* extending radially from its central portion, and the branch tubes 16 are retained at the respective tips of the arms 61*a*. The support 62 supports the other six branch tubes 16 of the 12 branch tubes 16 that are disposed circumferentially evenly. The support 62 includes arms 62*a* extending radially from its central portion, and the branch tubes 16 are retained at the respective tips of the arms 62*a*. In this embodiment, the support 61 and the support 62 are staggered circumferentially by 30 degrees in the heating tube 12, and each retains six branch tubes 16. The material moving from the first end 12*a* side toward the second end 12*b* side passes through the gaps between the arms 61*a* and 62*a* of the supports 61 and 62. Such supports 61 and 62 may include a plurality of supports 61 and 62 disposed along the longitudinal direction of the branch tubes 16.

Although the branch tubes 16 disposed in the heating tube 12 have been described herein, the configuration of the branch tubes 16 is not limited to this embodiment. Although the number of the plurality of branch tubes 16 is 12 in this embodiment, the number of branch tubes 16 is not limited to 12. Moreover, the above-described embodiment describes that the plurality of branch tubes 16 are disposed circumferentially evenly, the plurality of branch tubes 16 do not need to be disposed evenly. The support for supporting intermediate portions of the branch tubes 16 does not need to be provided in such cases that, for example, the length of the heating tube 12 or the branch tubes 16 is short.

Drive Mechanism 18

The drive mechanism 18 is a mechanism for rotating the heating tube 12. The heating tube 12 is provided with the heat insulating tube 46 fitted around the end portion on the first end 12*a* side and the heat insulating tube 56 fitted around the end portion on the second end 12*b*. A chain sprocket 18*a* and a tire 18*b* are fitted on an outside of the heat insulating tube 46 on the first end 12*a* side. A tire 18*c* is fitted on an outside of the heat insulating tube 56 on the second end 12*b* side. The tires 18*b* and 18*c* are supported respectively by rollers 18*d* and 18*e*. This allows both ends of the heating tube 12 to be supported rotatably via the tires 18*b* and 18*c*.

Figure 8:
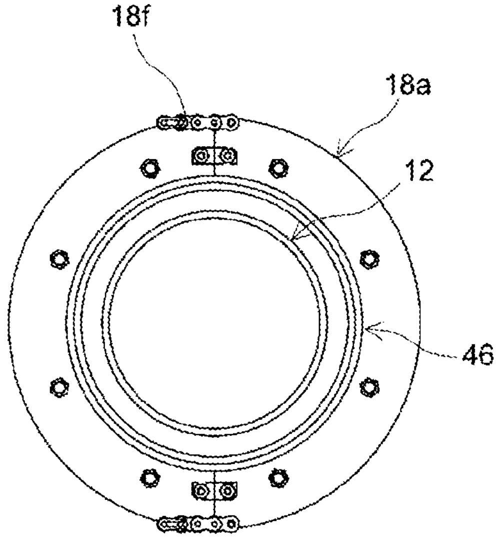
FIG. 8 is a cross-sectional view of the heating tube 12 shown in FIG. 1, taken along line VIII-VIII.

FIG. 8 is a cross-sectional view of the heating tube 12 shown in FIG. 1, taken along line VIII-VIII. FIG. 8 shows the chain sprocket 18*a* attached to the outer circumference of the heating tube 12. In this embodiment, the chain sprocket 18*a* is attached on the outside of the heat insulating tube 46 disposed on the first end 12*a* side of the heating tube 12, as illustrated in FIG. 8. A chain 18*f* is wrapped around the chain sprocket 18*a*, as illustrated in FIG. 8. The chain 18*f* causes the chain sprocket 18*a* to rotate by obtaining a drive force from a drive device, which is not shown, to rotate the heating tube 12. In this embodiment, the heating tube 12, the inner cylinder 15, and the branch tubes 16 are connected to each other, so when the heating tube 12 rotates, the heating tube 12, the inner cylinder 15, and the branch tubes 16 rotate integrally. The chain sprocket 18*a* is a half-split type member which is attached outward of the heat insulating tube 46 around the outer circumference of the heating tube 12. It should be noted that FIG. 8 does not depict the details of the interior of the heating tube 12, such as the branch tubes 16, as appropriate.

Figure 9:
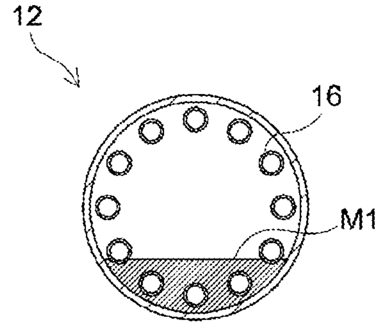
FIG. 9 is a cross-sectional view of the heating tube 12.

With the rotary kiln 10 shown in FIG. 1, material is fed to the heating tube 12 from the screw feeder 40 attached to the first end 12*a* side of the heating tube 12. The material is delivered at a predetermined velocity from the screw feeder 40 into the heating tube 12. FIG. 9 is a cross-sectional view of the heating tube 12. FIG. 9 shows material M1 supplied to the heating tube 12. As described previously, the heating tube 12 is provided with a slope such that the first end 12*a* is higher than the second end 12*b*. The heating tube 12 is rotated at a predetermined velocity by the drive mechanism 18. As illustrated in FIG. 9, the material supplied into the heating tube 12 from the screw feeder 40 is leveled by rotation of the heating tube 12, gathered in a lower portion of the heating tube 12 to a predetermined depth, and allowed to flow gradually toward the second end 12*b*.

In this embodiment, the inner cylinder 15 is in a hollow cylindrical shape, and approximately a constant gap is formed between the outer circumferential surface of the inner cylinder 15 and the inner circumferential surface of the heating tube 12 along radial directions of the heating tube 12. The material M1 may be supplied, for example, to such a depth that it does not come into contact with the outer circumferential surface of the inner cylinder 15. This prevents the material M1 from making contact with the inner cylinder 15 directly and reduces the heat transfer from the inner cylinder 15 to the material M1. Inside the heating tube 12, the plurality of branch tubes 16 extend in an axial direction along the inner circumferential surface of the heating tube 12, as described above. Inside the heating tube 12, the branch tubes 16 rotate integrally with the heating tube 12. Therefore, although the material in the heating tube 12 has gathered in the lower portion of the heating tube 12, the material is repeatedly lifted and then dropped by the branch tubes 16 when the heating tube 12 rotates. Accordingly, the material supplied into the heating tube 12 is gradually mixed as it gradually flows toward the second end 12*b* inside the heating tube 12. Because each of the branch tubes 16 is in a hollow cylindrical shape in this embodiment, the material M1 smoothly slides down from the branch tubes 16. For this reason, the material M1 is unlikely to scatter in the heating tube 12.

On the other hand, the branch tubes 16 branch from the inner cylinder 15, which is provided on the first end 12*a* side. To the inner cylinder 15, the hot air supply tube 17 is connected, to supply hot air to the inner cylinder 15. As with the heating tube 12, the inner cylinder 15 and the branch tubes 16 are sloped so that the parts of the inner cylinder 15 and the branch tubes 16 that are adjacent to the first end 12*a* are higher. Therefore, the hot air supplied to the inner cylinder 15 rises from the inner cylinder 15 toward the branch tubes 16. The branch tubes 16 penetrate the support plate 12*a*2 disposed on the first end 12*a* side of the heating tube 12, and open into the interior of the exhaust duct 20. Therefore, the hot air atmosphere is discharged to the exhaust duct 20.

The rotary kiln 10 may be configured to prevent the gas inside the exhaust duct 20 from flowing into the heating chamber 25. In this embodiment, an exhaust fan 21*a* is provided downstream of the exhaust port 21. This allows the interior of the exhaust duct 20 to be kept at a lower pressure than the interior of the heating chamber 25, to prevent gas from flowing from the exhaust duct 20 into the heating chamber 25. Also in this embodiment, the branch tubes 16 extend from the first end 12*a* of the heating tube 12 out of the heating tube 12, and the exhaust duct 20 is provided outward of the first end 12*a* of the heating tube 12 so as to cover the outlet of each of the branch tubes 16. This allows the hot air exhausted through the branch tubes 16 to be exhausted through the exhaust duct 20. Inside the exhaust duct 20, the atmosphere gas inside the heating chamber 25 may mix with combustion gas. However, the mixed gas is unlikely to flow into the heating chamber 25. In addition, the flow passages of the hot air atmosphere are separated by the branch tubes 16 in the heating tube 12. Thus, the atmosphere gas inside the heating tube 12 and the hot air atmosphere flowing through the branch tubes 16 do not mix with each other easily, so the powdery material inside the heating tube 12 can be heated by an appropriate atmosphere. In addition, the drain 22 may be provided with a lid or a valve so as to prevent outside air from flowing from the drain 22 into the exhaust duct 20 during normal operation.

The material M1 flows toward the second end 12*b* as it is repeatedly lifted and then dropped by the branch tubes 16 when the heating tube 12 rotates. In this process, as heat is given from the branch tubes 16, the material M1 is gradually heated. In addition, the branch tubes 16 include a plurality of tubes arranged circumferentially on the outer circumferential surface of the inner cylinder 15 inside the heating tube 12, and each of the branch tubes 16 branches from the inner cylinder 15 and extends in an axial direction along the inner circumferential surface of the heating tube 12. Therefore, the contact area between the branch tubes 16 and the material M1 flowing through the heating tube 12 is large so that the material M1 can be heated in a short time. For example, when the rotary kiln 10 is used for drying the material M1, the time required for drying is reduced.

In addition, the rotary kiln 10 according to this embodiment is equipped with the heating chamber 25 including the tunnel-shaped furnace body 27 in which the heater 26 is disposed, and the heating tube 12 penetrates the furnace body 27 and is configured to be rotatable with respect to the furnace body 27. This allows the temperature outside the heating tube 12 to be stable. For example, in this embodiment, the tunnel-shaped furnace body 27 is provided with partitions 28. The interior of the furnace body 27 is divided into three spaces A1 to A3 along the direction in which the heating tube 12 penetrates.

Furthermore, the first end 12*a* of the heating tube 12 protrudes from the heating chamber 25 and extends outward. The temperature of the hot air flowing through the branch tubes 16 gradually lowers from the second end 12*b* side toward the first end 12*a* side. Accordingly, the temperature in a portion A4 of the heating tube 12 on the first end 12*a* side that protrudes from the heating chamber 25 and extends outward is lower than the rest of the interior of the heating chamber 25. The just-mentioned portion A4 is a portion into which material is charged from the screw feeder 40, which may serve as a preheat region in which the material charged from the screw feeder 40 is gradually heated.

The material is heated inside the heating tube 12 in the three spaces A1 to A3 within the heating chamber 25. In the portions disposed in the spaces A1 to A3, the outside of the heating tube 12 is heated by the heater 26 provided for the furnace body 27. This allows the temperature inside the heating tube 12 to be adjusted to an appropriate temperature. Accordingly, the material is heat-treated in the three spaces A1 to A3 within the heating chamber 25 while being adjusted to predetermined temperatures step by step. Furthermore, the second end 12*b* of the heating tube 12 protrudes from the heating chamber 25 and extends outward. In this embodiment, the branch tubes 16 branch from the inner cylinder 15 at a location where the heating tube 12 enters the furnace body 27, as viewed from the second end 12*b*. Accordingly, in a portion A5 of the heating tube 12 on the second end 12*b* side that protrudes from the heating chamber 25, the material M1 receives heat only from the inner cylinder 15. Therefore, the temperature of the material M1 is gradually lowered. Thus, the material that is discharged from the heating tube 12 to the casing 51 in the material collection unit 14 has been cooled to be colder than that inside the furnace body 27, and brought to a temperature at which the material can be easily treated in post-processes. Although the heating chamber 25 is provided outside the heating tube 12 in this embodiment, it is also possible that the heating chamber 25 may not be provided unless specifically stated otherwise.

Hot air is supplied from the second end 12*b* side of the heating tube 12 through the inner cylinder 15 and the branch tubes 16. The temperature of the hot air gradually lowers from the second end 12*b* side toward the first end 12*a* side of the heating tube 12. On the other hand, the material is supplied at the first end 12*a* side and gradually flows toward the second end 12*b*. The material is supplied at the first end 12*a* side and gradually heated as it moves toward the second end 12*b* while making contact with the branch tubes 16. When it is desired that the material M1 be heated to 350° C., for example, the branch tubes 16 may be set to be brought to a predetermined temperature inside the heating tube 12. Because the material M1 is heated by coming into direct contact with the branch tubes 16 inside the heating tube 12, the material M1 is heated to a predetermined temperature in a relatively short time. This reduces the residence time of the material M1 inside the heating tube 12. Moreover, the portion A5 in which the material M1 does not come into direct contact with the branch tubes 16 is provided in the second end 12*b* side of the heating tube 12, and the material M1 is easily cooled in that portion. This causes the material M1 to be discharged in a cooler condition than that in the furnace body 27, allowing it to be handled more easily in post-processes.

As has been described above, the rotary kiln 10 according to this embodiment includes a heating tube 12, a material feeding unit 13, a material collection unit 14, an inner cylinder 15, branch tubes 16, a hot air supply tube 17, and a drive mechanism 18. Herein, the heating tube 12 is a substantially hollow cylindrical tube arranged such that its first end 12*a* is higher than its second end 12*b*. The material feeding unit 13 is disposed on the first end 12*a* of the heating tube 12. The material collection unit 14 is disposed on the second end 12*b* of the heating tube 12. The inner cylinder 15 is supported by the heating tube 12 at the second end 12*b* of the heating tube 12 with the inner cylinder 15 being inserted in a central portion of the heating tube 12. The branch tubes 16 include a plurality of tubes arranged circumferentially on the outer circumferential surface of the inner cylinder 15 inside the heating tube 12. Each of the branch tubes 16 branches from the inner cylinder 15 and extends in an axial direction along the inner circumferential surface of the heating tube 12. The hot air supply tube 17 is supported to be relatively rotatable with respect to the inner cylinder 15 with the hot air supply tube 17 being inserted in one end of the inner cylinder 15 that extends out of the heating tube 12. The drive mechanism 18 integrally rotates the heating tube 12, the inner cylinder 15, and the branch tubes 16.

With such a rotary kiln 10, the material M1 supplied from the material feeding unit 13 to the first end 12*a* side of the heating tube 12 is brought into contact with the branch tubes 16 while flowing toward the second end 12*b* inside the heating tube 12, and is heated while being mixed together. This means that heat transfer efficiency to the material M1 is high, so it is possible to dry or calcinate the material M1 in a short time. In addition, hot air passes through the inner cylinder 15 and the branch tubes 16, so it does not mix with the atmosphere gas inside the heating tube 12. Accordingly, it is possible to produce an atmosphere suitable for a heat treatment of the material M1 (for example, N2 atmosphere) inside the heating tube 12. Moreover, heating to the material M1 is restrained in a portion of the heating tube 12 closer to the second end 12*b* than the location at which the branch tubes 16 branch. This enables the temperature of the material M1 to be slightly lowered when it is discharged.

It is possible that each of the branch tubes 16 may be a hollow cylinder. This prevents the material M1 from scattering inside the heating tube 12. It is also possible that the inner cylinder 15 may be a hollow cylinder. As a result, a space with a predetermined depth is formed between the inner cylinder 15 and the inner circumferential surface of the heating tube 12. By adjusting the depth at which the material M1 flows through such a space, the material M1 is allowed to flow through the space without making contact with the inner cylinder 15. Moreover, heating to the material M1 is restrained in the part closer to the second end 12*b* than the location at which the branch tubes 16 branch.

Figure 10:
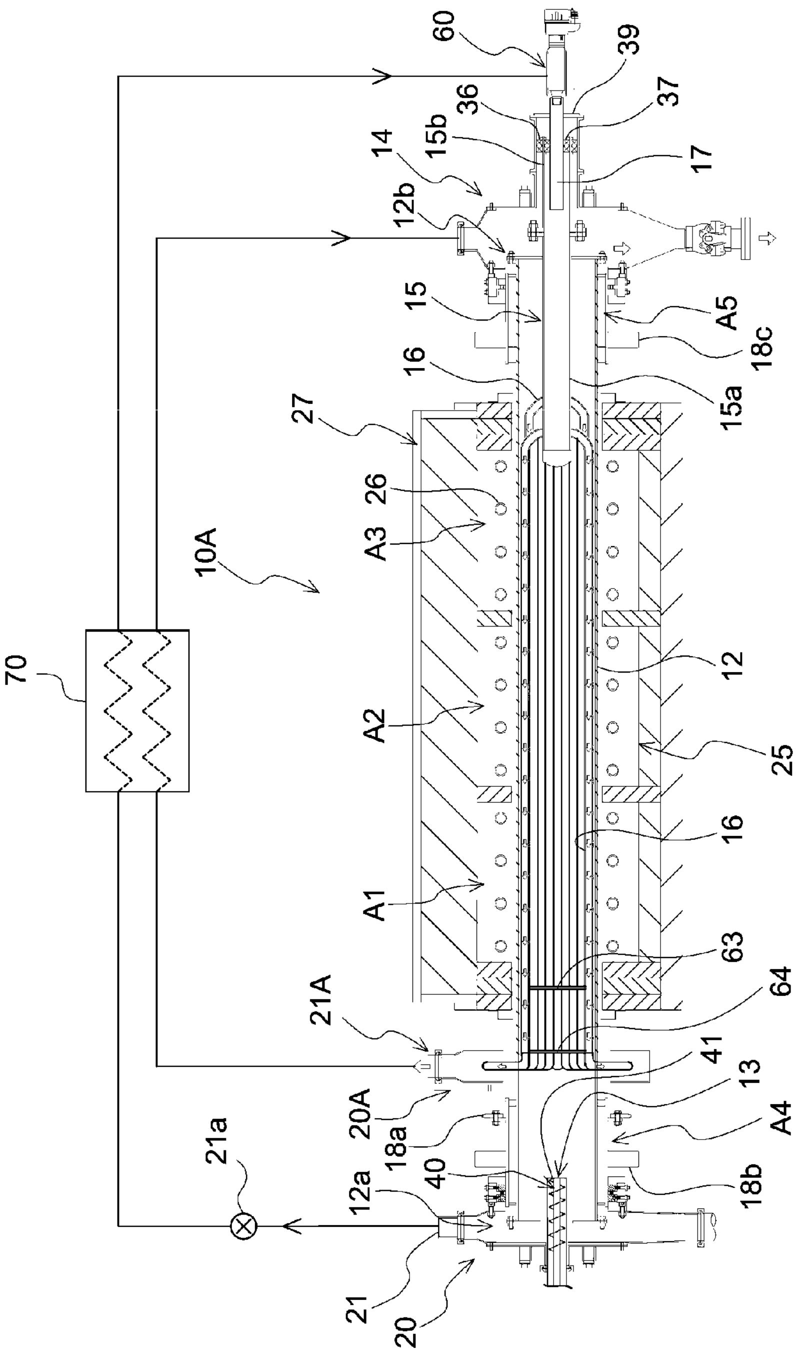
FIG. 10 is a longitudinal cross-sectional view of a rotary kiln 10A.

FIG. 10 is a longitudinal cross-sectional view of a rotary kiln 10A. In this embodiment, the rotary kiln 10A includes branch tubes 16 extending out of the heating tube 12 at an intermediate portion of the heating tube 12. An exhaust duct 20A is disposed at the intermediate portion of the heating tube 12 so as to cover the outlets of the branch tubes 16 extending out of the heating tube 12. In the embodiment shown in FIG. 10, the exhaust duct 20A is an annular duct that is circumferentially continuous on the intermediate portion of the heating tube 12. An exhaust port 21A that exhausts the collected hot air atmosphere is provided at the top of the exhaust duct 20A. In the embodiment shown in FIG. 10, supports 63 and 64 are provided for supporting the tip portions of the branch tubes 16. As with the previously-mentioned supports 61 and 62 (see FIGS. 6 and 7), each of the supports 63 and 64 includes arms extending radially from a central portion of the heating tube 12. In this case, the branch tubes 16 extend to the intermediate portion of the heating tube 12, but no branch tube 16 is provided for the part of the heating tube 12 that is closer to the first end 12*a* than the intermediate portion. In a preheat region A4 on the first end 12*a*, the material supplied from the screw feeder 40 is slowly heated before it comes into contact with the branch tubes 16.

In the embodiment shown in FIG. 10, because the branch tubes 16 extend outside at the intermediate portion of the heating tube 12, there is no way that the hot air atmosphere flowing through the branch tubes 16 can enter the interior of the heating tube 12. In addition, at the intermediate portion of the heating tube 12, the branch tubes 16 may penetrate the heating tube 12 while maintaining hermeticity of the heating tube 12 and extend outside the heating tube 12. In this case, because the atmosphere gas inside the heating tube 12 does not mix with the hot air atmosphere, the atmosphere gas inside the heating tube 12 is easily made stable. Furthermore, in the embodiment shown in FIG. 10, the atmosphere gas inside the heating tube 12 that is collected from the exhaust duct 20 on the first end 12*a* of the heating tube 12 and the hot air atmosphere exhausted from the branch tubes 16 that is collected by the exhaust duct 20A may each be sent to a heat exchanger 70 to effect heat exchange therebetween. The atmosphere gas heated by the heat exchanger 70 may be supplied from the second end 12*b* side to the heating tube 12. It is also possible that the hot air atmosphere the waste heat of which has been collected by the heat exchanger 70 is again supplied to the hot air generating device 60 and then supplied through the inner cylinder 15 to the branch tubes 16. By this process, the thermal efficiency of the rotary kiln 10A may be improved.

Figure 11:
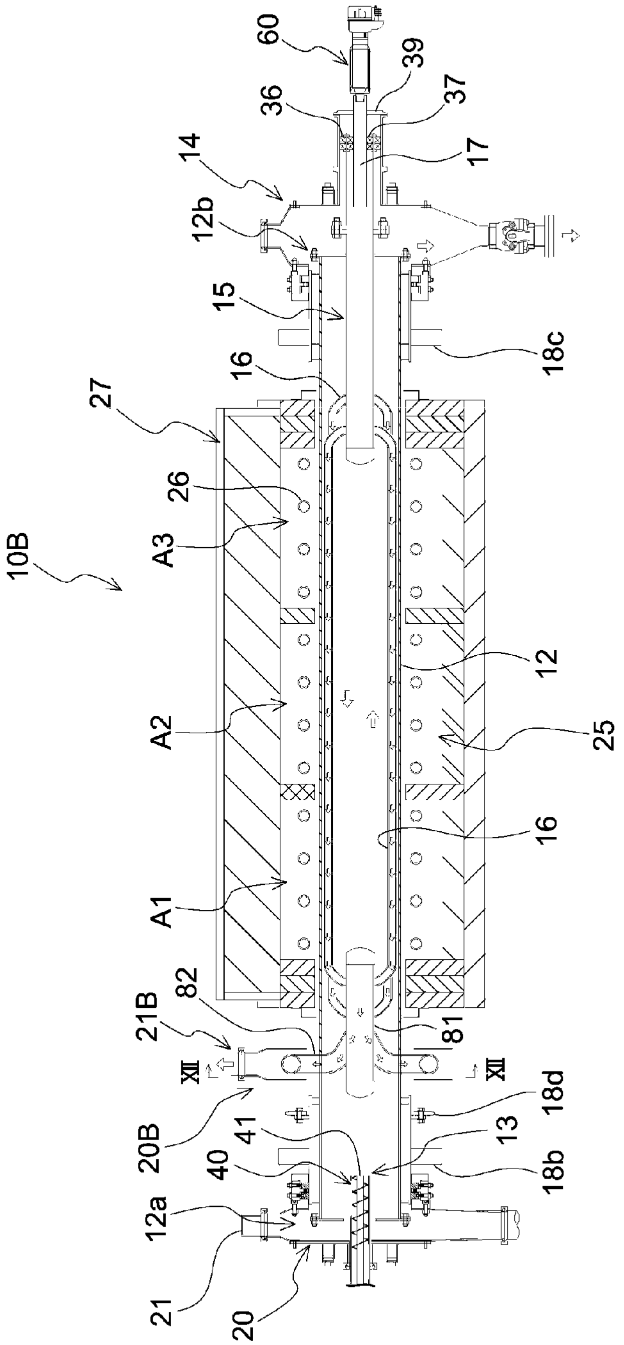
FIG. 11 is a longitudinal cross-sectional view of a rotary kiln 10B.
Figure 12:
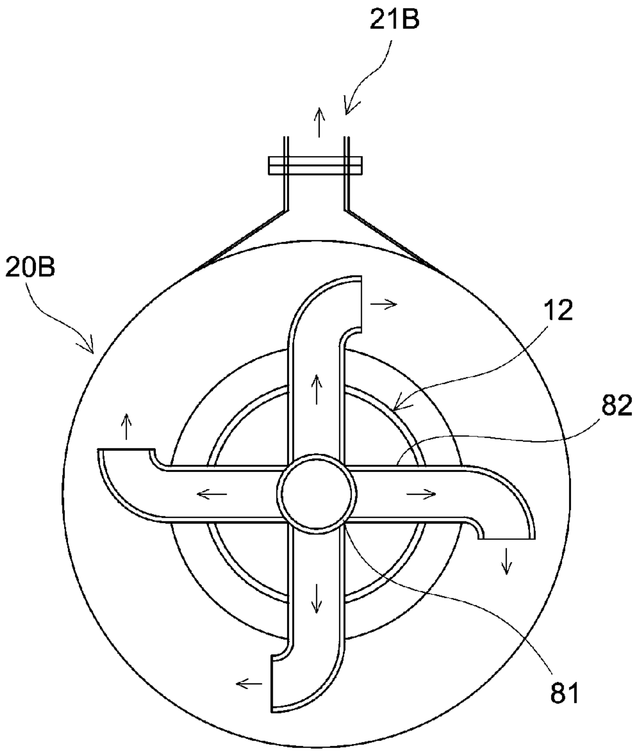
FIG. 12 is a cross-sectional view taken along line XII-XII in FIG. 11.

FIG. 11 is a longitudinal cross-sectional view of a rotary kiln 10B. FIG. 12 is a cross-sectional view taken along line XII-XII in FIG. 11. In this embodiment, the rotary kiln 10B includes a manifold 81 disposed at a central portion of the heating tube 12 and connected to branch tubes 16, and at least one exhaust tube 82 extending outside the heating tube 12 from the manifold 81. In this embodiment, the manifold 81 is a tubular body in a hollow cylindrical shape both ends of which are closed, and the branch tubes 16 are bent radially inward and connected to the outer circumferential surface of the manifold 81 so that the branch tubes 16 extending in an axial direction along the inner circumferential surface of the heating tube 12 can be connected to the interior of the manifold 81. In this embodiment, the manifold 81 is provided with four exhaust tubes 82, as illustrated in FIG. 12. The four exhaust tubes 82 are disposed circumferentially evenly around the manifold 81, and each of the exhaust tubes 82 extends radially outward of the manifold 81 and penetrates the heating tube 12. The tip end of each of the heating tubes 12 is bent and opened in a direction opposite to the rotational direction of the heating tube 12. For example, referring to FIG. 12, the heating tube 12 rotates in a counterclockwise direction (leftward direction), so the tip ends of the exhaust tubes 82 are bent rightward. This allows the exhaust tubes 82 to exhaust hot air smoothly in association with rotation of the heating tube 12.

An exhaust duct 20B is composed of an annular duct that is circumferentially continuous on an intermediate portion of the heating tube 12 so as to cover the tip ends of the branch tubes 82 outside the heating tube 12. An exhaust port 21B that exhausts the collected hot air atmosphere is provided at the top of the exhaust duct 20B. In this case as well, in the preheat region A4 on the first end 12*a*, the material supplied from the screw feeder 40 is slowly heated before it comes into contact with the branch tubes 16. Furthermore, because the manifold 81 is provided, it is possible to prevent chattering or the like that occurs in the branch tubes 16 due to the supply of hot air to the branch tubes 16.

Although various embodiments of the present disclosure have been described in detail hereinabove, it should be understood that the foregoing embodiments are merely exemplary and are not intended to limit the scope of the claims. Various other modifications and alterations may also be possible in the embodiments of the present disclosure. In addition, the features, structures, or steps described herein may be omitted as appropriate, or may be combined in any suitable combinations, unless specifically stated otherwise.

The invention claimed is:

1. A rotary kiln, comprising:

a substantially hollow cylindrical heating tube;

a material feeding unit disposed on a first end of the heating tube;

a material collection unit disposed on a second end of the heating tube;

an inner cylinder supported at the second end of the heating tube with the inner cylinder being inserted in a central portion of the heating tube;

a plurality of branch tubes disposed inside the heating tube and circumferentially on an outer circumferential surface of the inner cylinder, each of the branch tubes branching from the inner cylinder and extending in an axial direction along an inner circumferential surface of the heating tube;

a hot air supply tube supported to be relatively rotatable with respect to the inner cylinder with the hot air supply tube being inserted in one end of the inner cylinder that extends outside the heating tube;

a drive mechanism rotating the heating tube; and an exhaust duct being disposed outside a part of the heating tube on the first end and covering an outlet of each of the branch tubes, wherein the branch tubes extend outside the heating tube from the part of the heating tube on the first end.

2. The rotary kiln according to claim 1, wherein each of the branch tubes is a hollow cylindrical tube.

3. The rotary kiln according to claim 1, wherein the inner cylinder is a hollow cylindrical tube.

4. The rotary kiln according to claim 1, further comprising:

a tunnel-shaped furnace body; and a heater disposed in the furnace body, wherein the heating tube penetrates the furnace body and is configured to be rotatable with respect to the furnace body.

5. The rotary kiln according to claim 4, wherein the branch tubes branch at a location where the heating tube enters the furnace body.

6. The rotary kiln according to claim 1, wherein the heating tube is configured to deliver powdery material from a part of the heating tube adjacent to the first end toward the second end via circumferential rotation.

7. The rotary kiln according to claim 1, wherein the first end of the heating tube is arranged to be higher than the second end.

8. The rotary kiln according to claim 7, wherein the heating tube includes a slope extending between the first end and the second end and having an angle of slope of 0.5 degrees to 1 degree.

9. The rotary kiln according to claim 1, further comprising a spiral blade disposed on the inner circumferential surface of the heating tube.

10. A rotary kiln, comprising:

a substantially hollow cylindrical heating tube;

a material feeding unit disposed on a first end of the heating tube;

a material collection unit disposed on a second end of the heating tube;

an inner cylinder supported at the second end of the heating tube with the inner cylinder being inserted in a central portion of the heating tube;

a plurality of branch tubes disposed inside the heating tube and circumferentially on an outer circumferential surface of the inner cylinder, each of the branch tubes branching from the inner cylinder and extending in an axial direction along an inner circumferential surface of the heating tube;

a hot air supply tube supported to be relatively rotatable with respect to the inner cylinder with the hot air supply tube being inserted in one end of the inner cylinder that extends outside the heating tube;

a drive mechanism rotating the heating tube; and an exhaust duct covering an outlet of each of the branch tubes that extends outside the heating tube, wherein the branch tubes extend outside the heating tube at an intermediate portion of the heating tube.

11. The rotary kiln according to claim 10, further comprising: a manifold disposed at a central portion of the heating tube and connected to the branch tubes; and at least one exhaust tube extending outside the heating tube from the manifold.

12. The rotary kiln according to claim 10, wherein the exhaust duct is an annular duct that is circumferentially continuous on the intermediate portion of the heating tube.

* * * * *